(12) United States Patent
Kim et al.

(10) Patent No.: US 8,364,837 B2
(45) Date of Patent: Jan. 29, 2013

(54) VIRTUAL WEB SERVICE

(75) Inventors: Moon J. Kim, Wappingers Falls, NY (US); Juan Leon Rodriguez, San Ysidro, CA (US); Joshua M. Woods, Farnhamville, IA (US); Eric T. C. Yee, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 12/019,230

(22) Filed: Jan. 24, 2008

(65) Prior Publication Data

US 2009/0190601 A1    Jul. 30, 2009

(51) Int. Cl.
*G06F 15/16* (2006.01)
*H04L 12/28* (2006.01)
(52) U.S. Cl. .................. 709/231; 709/219; 370/401
(58) Field of Classification Search .................. 709/219
See application file for complete search history.

(56) References Cited

U.S. PATENT DOCUMENTS

| 7,076,558 | B1 | 7/2006 | Dunn | |
|---|---|---|---|---|
| 2004/0214572 | A1* | 10/2004 | Thompson et al. | 455/435.2 |
| 2005/0188420 | A1 | 8/2005 | Benantar et al. | |
| 2005/0268333 | A1* | 12/2005 | Betts et al. | 726/11 |
| 2006/0031436 | A1* | 2/2006 | Sakata et al. | 709/221 |
| 2006/0107335 | A1* | 5/2006 | Frank et al. | 726/27 |

FOREIGN PATENT DOCUMENTS

WO    2005069823 A2    8/2005

* cited by examiner

*Primary Examiner* — Wing F Chan
*Assistant Examiner* — David X Yi
(74) *Attorney, Agent, or Firm* — William E. Schiesser; Hoffman Warnick LLC (57) ABSTRACT

An improved solution for Web services is provided. In an embodiment of the invention, a method for providing a virtual Web service includes: providing a Web service gatekeeper, where the gatekeeper acts as an access point to multiple private internal enterprise environments; and then the gatekeeper receives a request for access to one, or more, of these private internal enterprise environments.

16 Claims, 6 Drawing Sheets

VIRTUAL WEB SERVICE

FIELD OF THE INVENTION

Aspects of the invention relate generally to Web services, and more particularly, to a virtual Web service.

BACKGROUND OF THE INVENTION

Typically, Web and other local services are made freely available, or are accessible on a per-fee basis uniquely tailored to the particular system and service in question. For example, when a corporation wishes to provide a Web service for aa fee, they must create unique infrastructure to both secure (from unpaid usage) and advertise their Web service. Another example is when a business traveler passes through an airport and wishes to access a wireless network. Every time the payment model and/or terms of the Web service are unique to the particular situation, it causes frustration to the user, as well as provides no mode for flexible pricing (e.g., an all-day pass for airports across a certain geography, etc.).

The aforementioned inefficiencies also may lead to higher service pricing because more development time is needed to deploy a particular service with its associated fee. This also leads to fragmentation because a heightened user intervention is required to gain access to the multitude of available services. As a result, no software can be made to utilize multiple Web services, thereby defeating an aspect of for-fee service oriented architecture.

In view of the foregoing, there is an opportunity to improve upon the related art.

SUMMARY OF THE INVENTION

Aspects of the invention provide an improved solution for Web services.

A first aspect of the invention provides a method of providing a virtual Web service, the method comprising: providing a Web service gatekeeper, the gatekeeper comprising an access point to a plurality of private internal enterprise environments; and receiving at the gatekeeper a request for access to one of the plurality of private internal enterprise environments.

A second aspect of the invention provides a system for providing a virtual Web service, the system comprising: a system for providing a Web service gatekeeper, the gatekeeper comprising an access point to a plurality of private internal enterprise environments; and a system for receiving at the gatekeeper a request for access to one of the plurality of private internal enterprise environments.

A third aspect of the invention provides a computer program comprising program code stored on a computer-readable medium, which when executed, enables a computer system to implement a method of providing a virtual Web service, the method comprising: providing a Web service gatekeeper, the gatekeeper comprising an access point to a plurality of private internal enterprise environments; and receiving at the gatekeeper a request for access to one of the plurality of private internal enterprise environments.

A fourth aspect of the invention provides a method of deploying a system for providing a virtual Web service, the method comprising: providing a computer system operable to: provide a Web service gatekeeper, the gatekeeper comprising an access point to a plurality of private internal enterprise environments; and receive at the gatekeeper a request for access to one of the plurality of private internal enterprise environments.

A fifth aspect of the invention provides a data processing system of providing a virtual Web service, comprising: a processing unit; a bus coupled to the processing unit; and a memory medium coupled to the bus comprising program code, which when executed by the processing unit causes the data processing system to: provide a Web service gatekeeper, the gatekeeper comprising an access point to a plurality of private internal enterprise environments; and receive at the gatekeeper a request for access to one of the plurality of private internal enterprise environments.

A sixth aspect of the invention provides a business method of providing a virtual Web service, the business method comprising: managing a network that includes at least one computer system operable to: provide a Web service gatekeeper, the gatekeeper comprising an access point to a plurality of private internal enterprise environments; and receive at the gatekeeper a request for access to one of the plurality of private internal enterprise environments; and receiving payment based on the managing.

The illustrative aspects of the invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved solution for virtual Web services. In an embodiment of the invention, a method includes: providing a Web service gatekeeper, the gatekeeper comprising an access point to a plurality of private internal enterprise environments; and receiving at the gatekeeper a request for access to one of the plurality of private internal enterprise environments. In an embodiment of the invention, a user may want to use (e.g., rent/purchase) a service. A service gatekeeper registers and/or authenticates the user and enables the user to view and/or select which service(s) they are interested in. When the user has completed his/her selection of services, the gatekeeper then communicates with the applicable private enterprise providing the services to confirm that the user is allowed to access its services. The user is then registered and/or authenticated with the appropriate private enterprise(s) which are hosting the selected service(s). A management and provisioning layer of this gatekeeper may establish and/or confirm the terms and contracts with a management and billing provisioning application of the private enterprise. Upon completion, billing and provisioning contracts and/or profiles are verified and processed. Upon completion, the service providers may receive the request to provide the requested services to the user. The user is thereby free to use the purchased/rented service(s) in accordance with the terms established. As used herein, unless otherwise noted, the term "set" means one or more (i.e., at least one); and, the phrase "any solution" means any now known or later developed solution.

Figure 1:
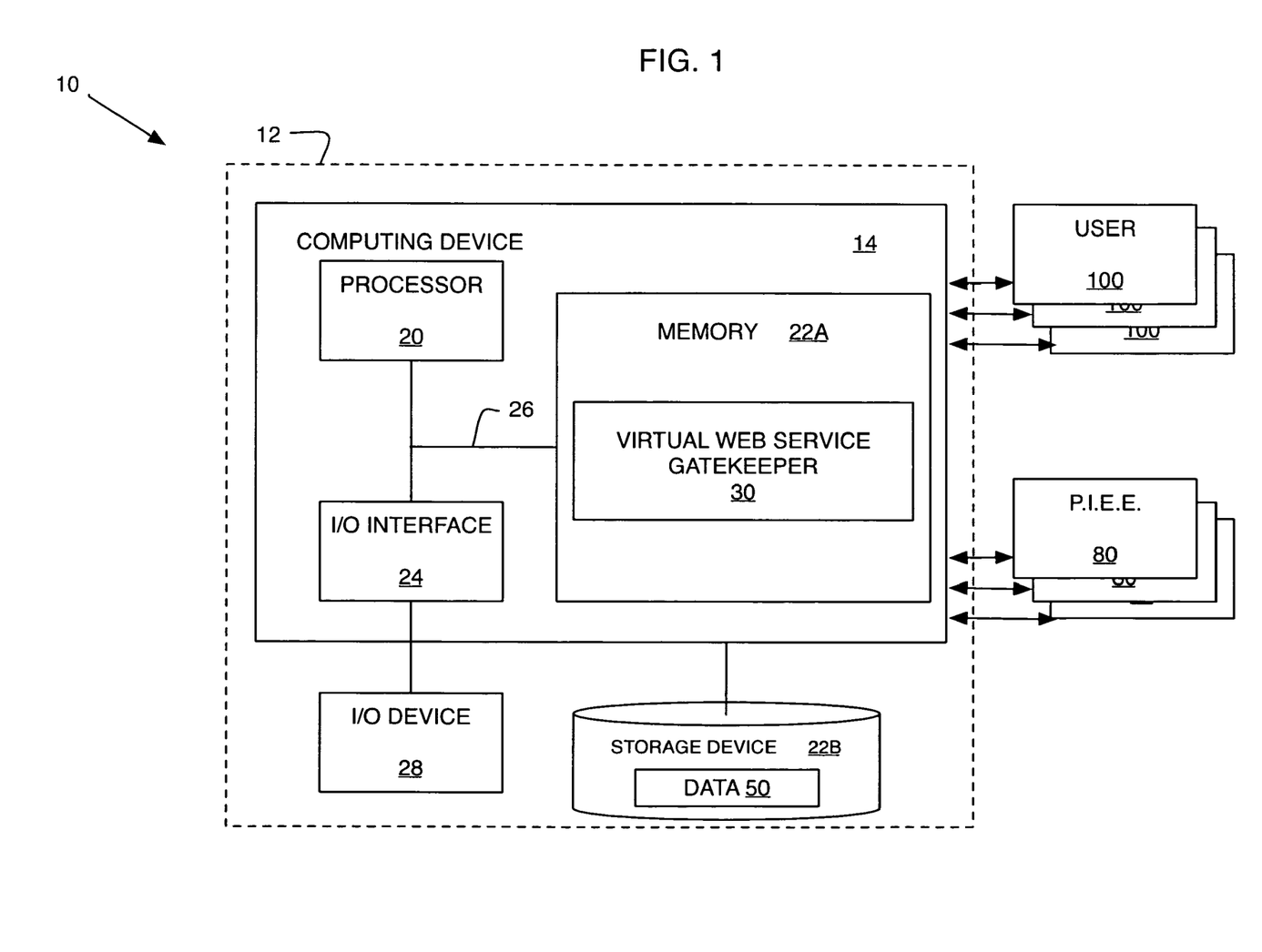
FIG. 1 shows an illustrative environment for providing a virtual Web service according to an embodiment of the invention.

Turning to the drawings, FIG. 1 shows an illustrative environment 10 for providing a virtual Web service according to an embodiment of the invention. To this extent, environment 10 includes a computer system 12 that can perform the process described herein in order to provide a virtual Web service. In particular, computer system 12 is shown including a computing device 14 that comprises virtual Web service gatekeeper 30, which makes computing device 14 operable to provide a virtual Web service, by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as virtual Web service gatekeeper 30, which is stored in a storage system, such as memory 22A and/or storage device 22B. While executing program code, processor 20 can read and/or write data to/from memory 22A, storage device 22B, and/or I/O interface 24. Bus 26 provides a communications link between each of the components in computing device 14. I/O device 28 can comprise any device that transfers information between a user 16 and computing device 14. To this extent, I/O device 28 can comprise a user I/O device to enable an individual user 100 to interact with computing device 14 and/or a communications device to enable a system user to communicate with computing device 14 using any type of communications link.

In any event, computing device 14 can comprise any general purpose computing article of manufacture capable of executing program code installed thereon. However, it is understood that computing device 14 and virtual Web service gatekeeper 30 are only representative of various possible equivalent computing devices that may perform the process described herein. To this extent, in other embodiments, the functionality provided by computing device 14 and virtual Web service gatekeeper 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

Figure 3:
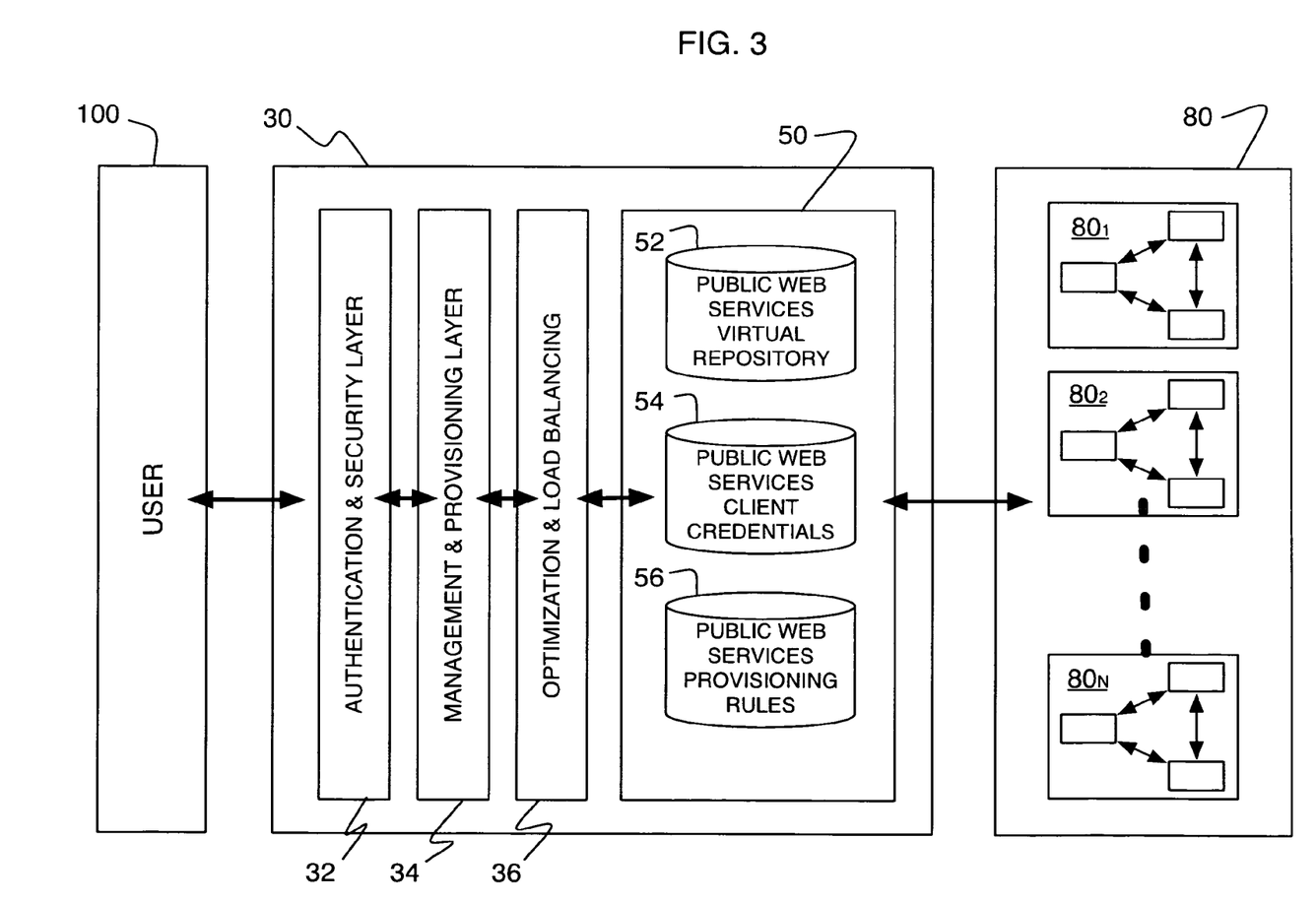
FIG. 3 shows an illustrative diagram of a portion of the system in FIG. 2 according to an embodiment of the invention.

As discussed herein, virtual Web service gatekeeper 30 enables computer system 12 to provide a virtual Web service. To this extent, virtual Web service gatekeeper 30 is shown in FIG. 3 as including an authentication and security layer 32, a management and provisioning layer 34, and optimization and load balancing 36. The virtual Web service gatekeeper 30 and/or the storage device 22B may further include data 50, including, for example, public web services virtual repository 52, public web services client credentials 54, and public web services provisioning rules 56. Operation of each of these entities is discussed further herein. However, it is understood that some of the various entities shown in FIG. 1 can be implemented independently, combined, and/or stored in memory of one or more separate computing devices that are included in computer system 12. Further, it is understood that some of the entities and/or functionality may not be implemented, or additional entities and/or functionality may be included as part of computer system 12.

User 100 may be any quantity (e.g., 1, 2, ... N) of entities (e.g., individual, group, client, public user, enterprise consumer of Web services, etc.) who is/are seeking access to any quantity (e.g., 1, 2, ... N) of private internal enterprise environments ("P.I.E.E.") 80. Aspects of the invention provide a method and system for creating a market around Web and/or other services. Aspects of the invention can be used in concert with Web service registries (e.g., UDDI) to not only provide pricing and negotiation mechanisms, but to determine dependent services and flexible pricing options. Aspects of the invention may also be done via a virtual Web service gatekeeper 30, or "gatekeeper", which is responsible for registering and authenticating users 100 to ensure that the users 100 are provisioned to interact with specific services. The virtual Web service gatekeeper 30 acts as a mediator, protecting both the clients (e.g., users 100) and the enterprises hosting services (e.g., private internal enterprise environments 80). In this manner, the virtual Web service gatekeeper 30 acts as a known, trusted entity.

Aspects of the invention provide an improved solution for virtual Web services. To this extent, FIGS. 2 through 6 show various illustrative diagrams of an application of the system 10 in FIG. 1 during user(s) 100, 202 (FIG. 6) attempting to obtain virtual Web services, according to various embodiments of the invention.

Figure 2:
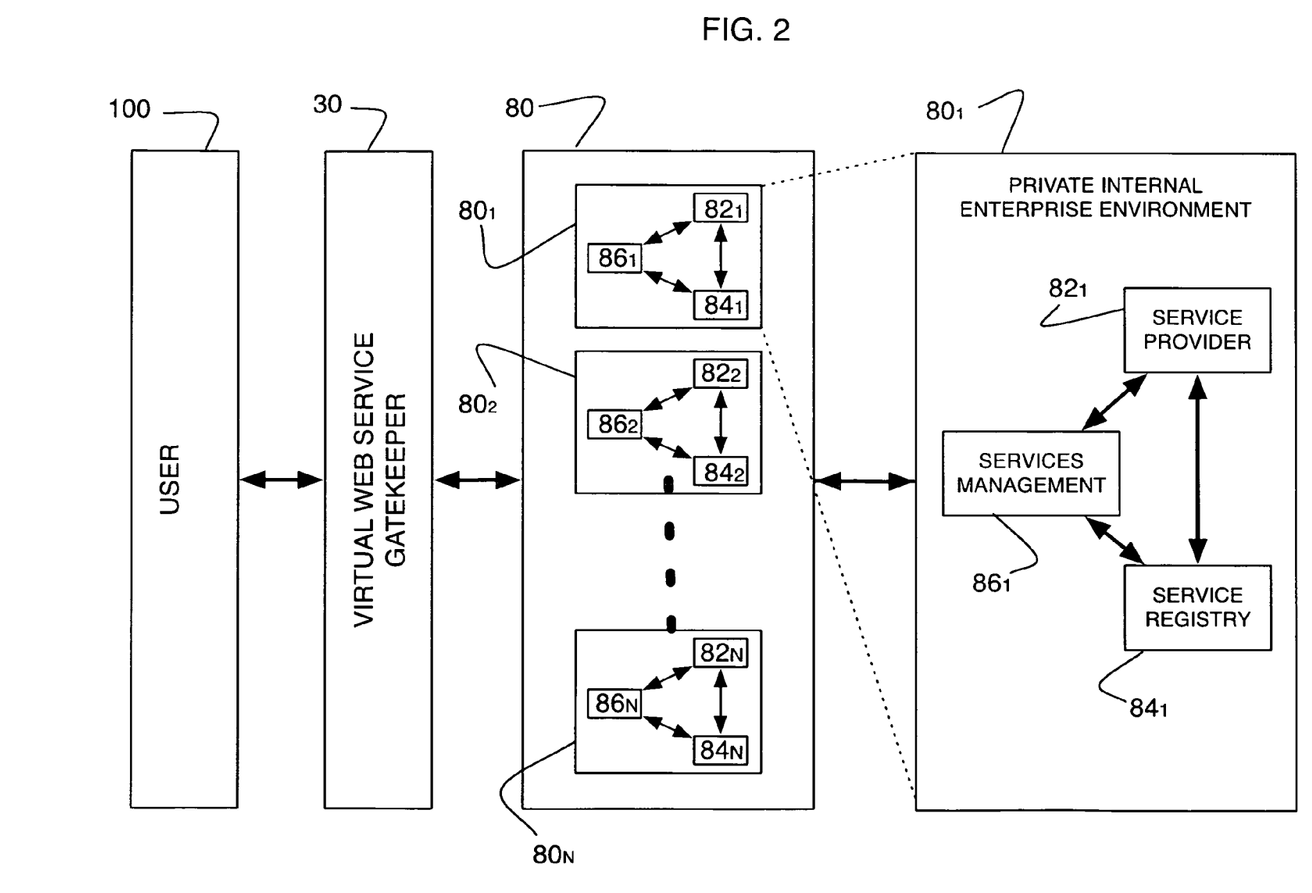
FIG. 2 shows an illustrative diagram of a system for providing a virtual Web service according to an embodiment of the invention.

As shown, for example, in FIG. 2, aspects of the present invention include a virtual Web service gatekeeper 30 which comprises an access point to a plurality of private internal enterprise environments (e.g., $80_1, 80_2, \ldots 80_N$). The virtual Web service gatekeeper 30 may receive a request for access to one of the plurality of private internal enterprise environments 80. As shown in FIG. 2 a user 100 may include any consumer/client that may be subscribers to services being offered. Each private internal enterprise environment ("P.I.E.E.") 80 may include a service provider 82, a service registry 84, and a services management 86 element. For example, a first P.I.E.E. $80_1$ includes a first service provider $82_1$, a first service registry $84_1$, and a first service management element $86_1$. Similar relationships may exist for the other P.I.E.E. $80_2, 80_N$. Various private and/or public enterprises (e.g., IBM) may lease and/or rent their respective Web services (e.g., via P.I.E.E. 80) to established and authorized users 100 (e.g., smb, outsource, business partner consumers, etc.). In this manner, a Web services on demand extends the Web services in a P.I.E.E. 80 to become effectively an on demand Web service provider(s) in a global public environment. Web services on demand enables such an extension through the creation of the virtual Web service gatekeeper 30, or On Demand Provisioning and Gatekeeper. The virtual Web service gatekeeper 30 may become the public interface for various types of consumers/clients (i.e., users 100) to search for Web services, to authorize, and/or the establish invoicing and provisioning. The virtual Web service gatekeeper 30, in turn, interfaces with various private or public enterprises of their Web services registry ("Service Registry") 84, service provider 82, and each of their respective services management 86.

Referring to FIG. 2, a more detailed diagram of the virtual Web service gatekeeper 30 is shown. The virtual Web service gatekeeper 30 may include an authentication and security layer 32 that is in charge of registering, authenticating, and/or providing security, including encryption negotiation, of users 100. The virtual Web service gatekeeper 30 may further include a management and provisioning layer 34 that is in charge of invoicing and terms, such as the services that are available to the user's 100 defined relationship and/or accessibility. The virtual Web service gatekeeper 30 may further include optimization and load balancing 36. The virtual Web service gatekeeper 30 and/or the storage device 22B (FIG. 1) may further include data 50 which may comprise a public Web services virtual repository 52, a public Web services client credentials 54, and/or public Web services provisioning rules 56. The data 50, or layer, provides the Web services description of the available services provided by their providers. The data 50 may further explain the characteristics and its protocols. The data 50 may further store the user's 100 credentials that are using the public Web services and include the provisioning rules 56 created by the Web services providers.

Figure 4:
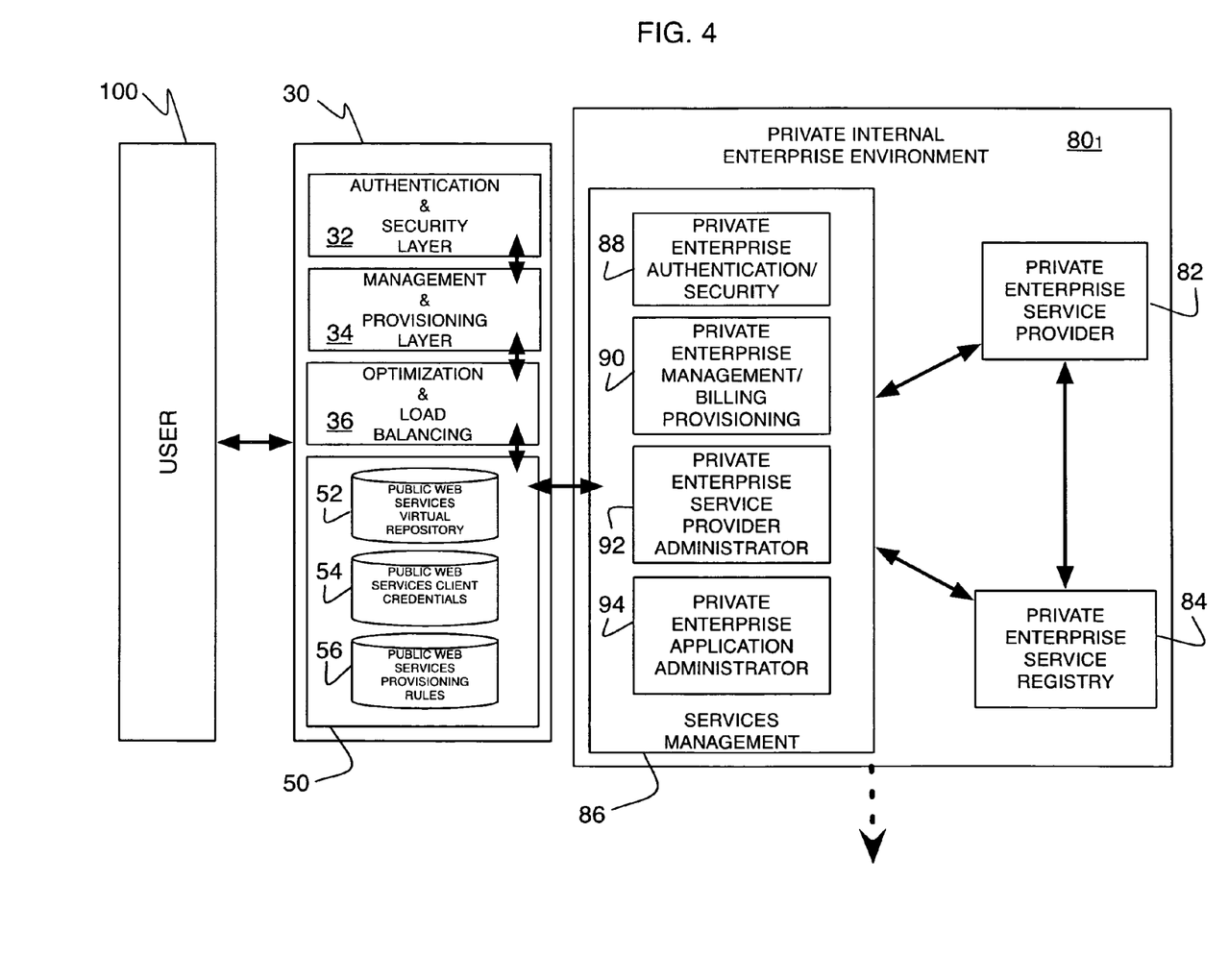
FIG. 4 shows an illustrative diagram of another portion of the system in FIG. 2 according to an embodiment of the invention.

Referring to FIG. 4, a more detailed view of the service management component 86 of the P.I.E.E. 80 is shown. The service management component 86 may directly interface with the virtual Web service gatekeeper 30 and may comprise a private enterprise authentication/security 88 that establishes the security standards and protocols of the specific P.I.E.E. 80. The private enterprise authentication/security 88 may for example define the level of security and the types of user profiles that it is able to authenticate. The private enterprise authentication/security 88 may further comprise private enterprise management/billing provisioning 90 that is similar to the management and provisioning layer 34 in that it defines its own billing and provisioning standards, and may also interface with the management and provisioning layer 34 of the virtual Web service gatekeeper 30. The private enterprise authentication/security 88 may further comprise a private enterprise service provider administrator 92 that coordinates the interaction of the private enterprise service provider 82 and the private enterprise service registry 84 of their own environment. Finally, the private enterprise authentication/security 88 may further comprise a private enterprise application administrator 94 that establishes the execution of the access request and processing of the Web services invoked by the user 100.

An exemplary method of employing the virtual Web service gatekeeper 30 may include a user 100 wants to use (e.g., rent, purchase, etc.) services to accomplish a task, which may be a Web service, or a set of Web services. Options may be provided to the user 100 based on registered services with the virtual Web service gatekeeper 30 and their provisioning rules (e.g. authentication, selection of option service, etc.). The virtual Web service gatekeeper 30 registers and/or authenticates the user 100 and enables the user 100 to view and/or select which service(s) they are interest in or a task to accomplish. The virtual Web service gatekeeper 30 may also look at current credentials with existing providers and/or create credentials in the public Web services virtual repository 52. The user 100 then selects a Web service or set of services from the P.I.E.E. 80 available. If credentials exist, the system uses it to authenticate with, for example, the selected enterprise (e.g., P.I.E.E. 80$_1$) and determine the service level agreement. Billing, a provisioning contract, and/or profiles are verified and processed based on credentials provided by virtual Web service gatekeeper 30. Then the private enterprise service provider 82 receives a request to retrieve and provide the requested Web services to the user 100. The private enterprise service registry 82 of the selected P.I.E.E. 80$_1$ sends the requested Web service to the user 100.

Figure 5:
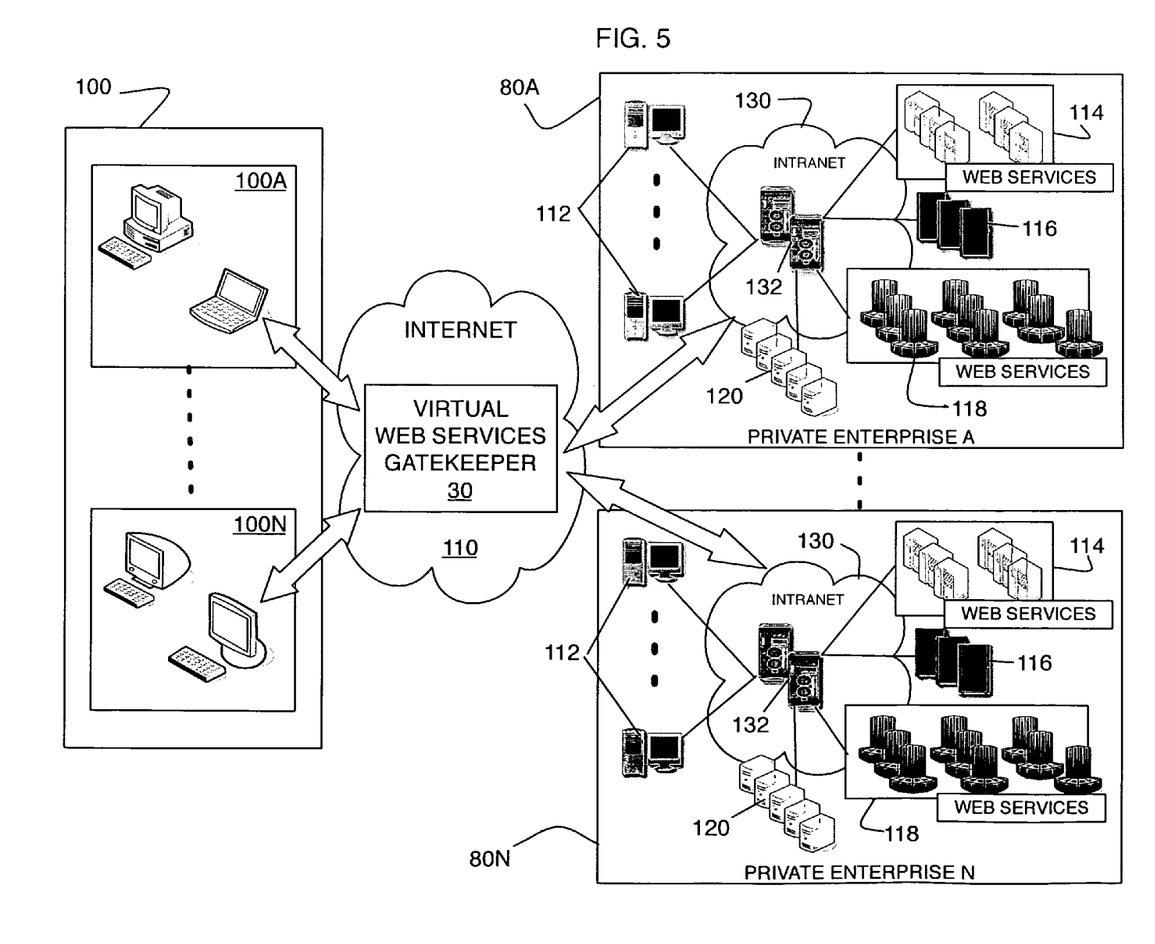
FIG. 5 shows an illustrative diagram of another system for providing a virtual Web service according to another embodiment of the invention.

Referring to FIG. 5 another embodiment showing a virtual Web services on demand model in a grid environment is depicted. A plurality of users 100A, . . . 100N are shown in communication with the virtual Web service gatekeeper 30 residing in the Internet 110. The virtual Web service gatekeeper 30 provides an access point to the plurality of P.I.E.E.s (e.g., "Private Enterprise A" 80A, . . . "Private Enterprise N" 80N). Each P.I.E.E. 80 may comprise a plurality of user workstations and applications 112, an intranet 130 that includes, for example, an IntraGrid management service 132, and various data centers, such as, Intel platforms 120, P-series platforms 114, 116, S/390 G4 platforms 118, and/or other types of Web services using now known or later developed technologies.

Figure 6:
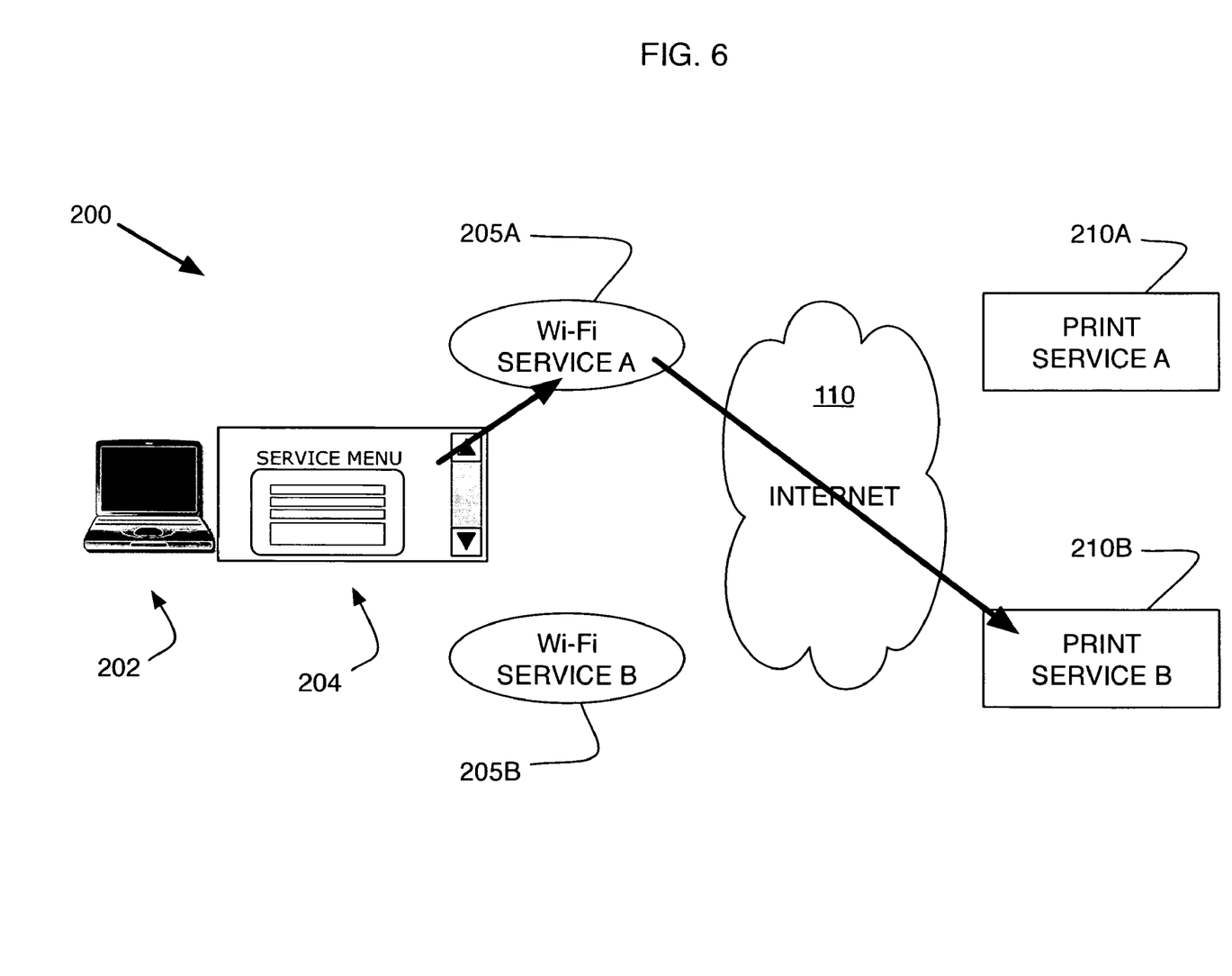
FIG. 6 shows an illustrative diagram of another system for providing a virtual Web service according to another embodiment of the invention.

Another embodiment showing an environment 200 for virtual Web services is depicted in FIG. 6. In the scenario shown a user 202 wants to print a document, yet is a mobile user and, as such, he/she is in a foreign environment and he/she currently does not have any network connectivity. The user 202 is able to get access to a services menu 204 that is provided by a virtual Web service gatekeeper 30 (see e.g., FIG. 1). Within the services menu 204, a list of available services that the user 202 can initiate including Wireless Fidelity/Local Area Network (Wi-Fi/LAN) services and print services. For example, the user 202 may access Wi-Fi Service A 205A and Wi-Fi Service B 205B. Similarly, through the Internet 110, the user 202 may also access Print Service A 210A and Print Service B 210B. The user 202 then selects the appropriate services that he/she requires, which in the example depicted include Wi-Fi and printing services. The user 202 may be provided attributes of the particular service, including name of service, type of service, provisioning information, pricing plans, and/or the like. Upon selection of the particular services and fulfilling the provisioning and payment model, the user 202 will then gain access to the services that he/she selected. As shown, the user 202 opts to select Web services comprising Wi-Fi Service A 205A and Print Service B 210B. In this manner a virtual Web service is provided to the user 202.

Aspects of the present invention provide for a method of automatic utilization of services with dependencies, including cross-service pricing models and an automated way for for-pay service to be purchased securely, with only proxied contact to the service providers billing systems. Aspects also provide for automatic workflow capability for services, providing for semi-automated methods of payment in which non-trusted individuals can use non-trusted services. Aspects of the present invention may also include a method for service providers and service users to negotiate the pricing between the parties, using a market economy.

In another embodiment, the invention provides a computer program stored on a computer-readable medium, which when executed, enables a computer system to provide a virtual Web service. To this extent, the computer-readable medium includes program code, such as virtual Web service gatekeeper 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of deploying a system for providing a virtual Web service. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that provides a virtual Web service, which enables users to perform the process described herein on a subscription, advertising, and/or fee basis. That is, a service provider could offer to manage a network and/or a computer system 12 (FIG. 1) that provides a virtual Web service as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of providing a virtual Web service, the method comprising:
    providing a Web service gatekeeper, the gatekeeper comprising an access point to a plurality of private internal enterprise environments that provide web services; and
    receiving at the gatekeeper a request for access to one of the plurality of private internal enterprise environments based on a selection by a user of a web service from a plurality of web services, the web service being operated by the one of the plurality of private internal enterprise environments from the plurality of private internal enterprise environments provided by the gatekeeper, the receiving further comprising:
        receiving a selection from a user for at least one of the plurality of private internal enterprise environments; and
        confirming access is allowable with the selected private internal enterprise environment;
    receiving per-fee payment based on the web services provided from the private internal enterprise environment via the managing,
    wherein the Web service gatekeeper further comprises a management and provisioning layer, the layer configured to establish and confirm terms and contracts with an application of the plurality of private internal enterprise environments; and
    wherein the web service that is selected is purchased via the gatekeeper with only proxied contact to the one of the plurality of private internal enterprise environments.

2. The method of claim 1, further comprising providing the plurality of private internal enterprise environments in a network environment, each of the plurality of private internal enterprise environments providing a web service on a per-fee basis.

3. The method of claim 1, further comprising connecting a user to at least one of the plurality of private internal enterprise environments, based on the request.

4. The method of claim 1, further comprising one of a registering and authenticating a user seeking access to the plurality of private internal enterprise environments.

5. The method of claim 1, each of the plurality of private internal enterprise environments comprising at least one of:
    a service registry;
    a service provider; and
    a services management component comprising:
        an authentication and security layer;
        a management and billing provisioning layer;
        a service provider administrator; and
        an application administrator.

6. The method of claim 1, the Web service gatekeeper further comprising at least one of:
    an authentication and security layer;
    a management and billing provisioning layer;
    an optimization and load balancing component;
    a virtual repository;
    client credentials; and
    provisioning rules.

7. A system for providing a virtual Web service, the system having at least one computer device that performs a method, comprising:
    providing a Web service gatekeeper, the gatekeeper comprising an access point to a plurality of private internal enterprise environments that provide web services; and receiving at the gatekeeper a request for access to one of the plurality of private internal enterprise environments based on a selection by a user of a web service from a plurality of web services, the web service being operated by the one of the plurality of private internal enterprise environments from the plurality of private internal enterprise environments provided by the gatekeeper, the receiving further comprising:

receiving a selection from a user for at least one of the plurality of private internal enterprise environments; and     confirming access is allowable with the selected private internal enterprise environment;

receiving per-fee payment based on the web services provided from the private internal enterprise environment via the managing, wherein the Web service gatekeeper further comprises a management and provisioning layer, the layer configured to establish and confirm terms and contracts with an application of the plurality of private internal enterprise environments, and wherein the web service that is selected is purchased via the gatekeeper with only proxied contact to the one of the plurality of private internal enterprise environments.

8. The system of claim 7, the method further comprising providing the plurality of private internal enterprise environments in a network environment, each of the plurality of private internal enterprise environments providing a web service on a per-fee basis.

9. The system of claim 7, the method further comprising connecting a user to at least one of the plurality of private internal enterprise environments, based on the request.

10. The system of claim 7, the method further comprising one of registering and authenticating a user seeking access to the plurality of private internal enterprise environments.

11. A computer program comprising program code stored on a computer-readable storage device, which when executed, enables a computer system to implement a method of providing a virtual Web service, the method comprising:

providing a Web service gatekeeper, the gatekeeper comprising an access point to a plurality of private internal enterprise environments that provide web services; and     receiving at the gatekeeper a request for access to one of the plurality of private internal enterprise environments based on a selection by a user of a web service from a plurality of web services, the web service being operated by the one of the plurality of private internal enterprise environments from the plurality of private internal enterprise environments provided by the gatekeeper, the receiving further comprising:

receiving a selection from a user for at least one of the plurality of private internal enterprise environments; and         confirming access is allowable with the selected private internal enterprise environment;

receiving per-fee payment based on the web services provided from the private internal enterprise environment via the managing,     wherein the Web service gatekeeper further comprises a management and provisioning layer, the layer configured to establish and confirm terms and contracts with an application of the plurality of private internal enterprise environments, and     wherein the web service that is selected is purchased via the gatekeeper with only proxied contact to the one of the plurality of private internal enterprise environments.

12. The computer program of claim 11, the method further comprising providing the plurality of private internal enterprise environments in a network environment, each of the plurality of private internal enterprise environments providing a web service on a per-fee basis.

13. The computer program of claim 11, the method further comprising connecting a user to at least one of the plurality of private internal enterprise environments, based on the request.

14. The computer program of claim 11, the method further comprising one of a registering and authenticating a user seeking access to the plurality of private internal enterprise environments.

15. A method of deploying a system for providing a virtual Web service, the method comprising:

providing a computer system that operates to perform operations of:

providing a Web service gatekeeper, the gatekeeper comprising an access point to a plurality of private internal enterprise environments that provide web services; and         receiving at the gatekeeper a request for access to one of the plurality of private internal enterprise environments based on a selection by a user of a web service from a plurality of web services, the web service being operated by the one of the plurality of private internal enterprise environments from the plurality of private internal enterprise environments provided by the gatekeeper, the receiving further comprising:

receiving a selection from a user for at least one of the plurality of private internal enterprise environments; and             confirming access is allowable with the selected private internal enterprise environment;

receiving per-fee payment based on the web services provided from the private internal enterprise environment via the managing,         wherein the Web service gatekeeper further comprises a management and provisioning layer, the layer configured to establish and confirm terms and contracts with an application of the plurality of private internal enterprise environments, and         wherein the web service that is selected is purchased via the gatekeeper with only proxied contact to the one of the plurality of private internal enterprise environments.

16. A business method for providing a virtual Web service, the business method comprising:

managing a network that includes at least one computer system that operates to perform operations of:

providing a Web service gatekeeper, the gatekeeper comprising an access point to a plurality of private internal enterprise environments that provide web services; and         receiving at the gatekeeper a request for access to one of the plurality of private internal enterprise environments based on a selection by a user of a web service from a plurality of web services, the web service being operated by the one of the plurality of private internal enterprise environments from the plurality of private internal enterprise environments provided by the gatekeeper, the receiving further comprising:

receiving a selection from a user for at least one of the plurality of private internal enterprise environments; and             confirming access is allowable with the selected private internal enterprise environment; and receiving per-fee payment based on the web services provided from the private internal enterprise environment via the managing, wherein the Web service gatekeeper further comprises a management and provisioning layer, the layer configured to establish and confirm terms and contracts with an application of the plurality of private internal enterprise environments, and wherein the per-fee payment is accomplished with only proxied contact to the private internal enterprise environment.

* * * * *